(12) United States Patent
Lindoff et al.

(10) Patent No.: US 8,498,599 B2
(45) Date of Patent: Jul. 30, 2013

(54) SIGNAL POWER MEASUREMENT METHODS AND APPARATUS

(75) Inventors: Bengt Lindoff, Bjärred (SE); Niklas Andgart, Södra Sandby (SE); Muhammad Ali Kazmi, Bromma (SE); Anders Rosenqvist, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1194 days.

(21) Appl. No.: 12/143,975

(22) Filed: Jun. 23, 2008

(65) Prior Publication Data

US 2009/0197555 A1    Aug. 6, 2009

Related U.S. Application Data

(60) Provisional application No. 61/025,083, filed on Jan. 31, 2008.

(51) Int. Cl.
*H04B 17/00* (2006.01)

(52) U.S. Cl.
USPC ............... 455/226.2; 455/101; 455/67.11; 455/68

(58) Field of Classification Search
USPC .......... 455/226.2, 226.3, 574, 101, 67.11–68, 455/226.1–226.4
See application file for complete search history.

(56) References Cited

U.S. PATENT DOCUMENTS

| 5,564,090 | A  | * | 10/1996 | Beauchamp et al. ......... 455/220 |
| 8,086,273 | B2 | * | 12/2011 | Zhou ........................... 455/562.1 |
| 8,340,032 | B2 | * | 12/2012 | Choi et al. ..................... 370/329 |
| 2004/0131108 | A1 | * | 7/2004 | Kyosti ........................... 375/148 |
| 2008/0008130 | A1 | * | 1/2008 | Haga et al. ..................... 370/331 |
| 2008/0031368 | A1 |   | 2/2008 | Lindoff et al. |
| 2008/0101488 | A1 |   | 5/2008 | Wilhelmsson et al. |
| 2009/0318090 | A1 |   | 12/2009 | Flordelis et al. |
| 2010/0279638 | A1 |   | 11/2010 | Lindoff |

FOREIGN PATENT DOCUMENTS

| GB | 2 355 366 A | 4/2001 |
| WO | 02/087106 A1 | 10/2002 |

OTHER PUBLICATIONS

3GPP Technical Report TR 25.814, V7.0.0, Physical Layer Aspects for Evolved Universal Terrestrial Radio Access (UTRA), Release 7, Jun. 2006, Section 7.1.1.2.2.
3GPP Technical Specification TS 36.211 V8.1.0, Physical Channels and Modulation, Release 8, Nov. 2007, Sections 6.10 and 6.11.
EPO, International Search Report in PCT/EP2009/050833, Jul. 8, 2009.
EPO, Written Opinion in PCT/EP2009/050833, Jul. 8, 2009.
Singapore I.P. Office, Written Opinion in 201004758-7, May 3, 2011.

* cited by examiner

*Primary Examiner* — Edward Urban
*Assistant Examiner* — Rui Hu
(74) *Attorney, Agent, or Firm* — Potomac Patent Group PLLC

(57) ABSTRACT

Methods and apparatus in a receiver for estimating a received power of at least one signal having a pattern known to the receiver, the signal having being transmitted by at least one antenna. A method includes using a first method of measuring the received power based on the pattern, the first method generating a first sequence of first power estimates; determining whether a predetermined first event has occurred; and if the first event has occurred, changing to a second method of measuring the received power, the second method being different from the first method and generating a second sequence of second power estimates.

18 Claims, 5 Drawing Sheets

SIGNAL POWER MEASUREMENT METHODS AND APPARATUS

This application is a non-provisional of and claims the benefit of the filing date of U.S. Provisional Patent Application No. 61/025,083 that was filed on Jan. 31, 2008.

BACKGROUND

This invention relates to radio communication systems and more particularly to measurement of received signal power in such systems.

In the continuing evolution of mobile cellular radio standards like GSM and wideband code division multiple access (WCDMA), new transmission techniques like orthogonal frequency division multiplex (OFDM) will be used in new cellular communication systems. Furthermore, to migrate smoothly from existing cellular systems to new high-capacity, high-data-rate systems in the existing radio spectrum, the new systems have to be able to operate with flexible communication channel bandwidths.

One such new flexible cellular communication system is called Third Generation Long Term Evolution (3G LTE), which is currently being standardized by the Third Generation Partnership Project (3GPP). The 3G LTE specifications can be seen as an evolution of the current WCDMA specifications also promulgated by the 3GPP. A 3G LTE system will use OFDM as a multiple access technique (called OFDMA) in the downlink (DL) from system nodes to user equipments (UEs), will operate with channel bandwidths ranging from 1.25 megahertz (MHz) to 20 MHz, and will support data rates up to 100 megabits per second (Mb/s) on the largest-bandwidth channels. Besides high-data-rate services, 3G LTE systems are expected to provide low-data-rate services, such as speech. Because 3G LTE is designed for packet data according to the familiar transmission control protocol/internet protocol (TCP/IP), it is expected that the service that carries speech will use voice-over-IP (VoIP).

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example, U.S. Patent Application Publication No. US 2008/0031368 A1 by B. Lindoff et al.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or Node B in 3G vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in 3G LTE and other communication systems. For example, the functionality of the RNCs 12, 14 can be moved to the Node Bs 22, 24, 26, and other functionalities can be moved to other nodes in the network. It will also be understood that a base station can use multiple transmit antennas to transmit information into a cell/sector/area, and those different transmit antennas can send respective, different pilot signals.

FIG. 2 is a frequency-vs.-time plot showing an arrangement of DL subcarriers in an OFDM communication system, such as a 3G LTE system. As shown in FIG. 2, a resource block includes twelve subcarriers spaced apart by fifteen kilohertz (kHz), which together occupy approximately 180 kHz in frequency and 0.5 millisecond (ms) in time, or one time slot. FIG. 2 shows each time slot including seven OFDM symbols, or resource elements (REs), each of which has a short (normal) cyclic prefix, although six OFDM symbols having long (extended) cyclic prefixes can also be used in a time slot. It will be understood that resource blocks can include various numbers of subcarriers for various periods of time.

An important aspect of a 3G LTE system is the mobility of the UEs, and so fast and efficient cell search and received signal power measurements are important for a UE to get and stay connected to a suitable cell, which can be called the "serving cell", and to be handed over from one serving cell to another. In current 3G LTE specifications, handover decisions are based on measurements of reference signals and symbols received power (RSRP), which can be defined as the average received signal power of reference symbols or signals (RS) transmitted by a Node B. A UE measures RSRP on its serving cell as well as on neighboring cells that the UE has detected as a result of a specified cell search procedure.

The RS, or pilots, are transmitted from each Node B at known frequencies and time instants, and are used by UEs for synchronization and other purposes besides handover. Such reference signals and symbols are described for example in Section 7.1.1.2.2 of 3GPP Technical Report (TR) 25.814 V7.0.0, Physical Layer Aspects for Evolved Universal Terrestrial Radio Access (UTRA) (Release 7), June 2006, and Sections 6.10 and 6.11 of 3GPP Technical Specification (TS) 36.211 V8.1.0, Physical Channels and Modulation (Release 8), November 2007.

RS are transmitted from each of possibly 1, 2, or 4 transmit antennas of a Node B on particular REs that can be conveniently represented on the frequency-vs.-time plane as depicted in FIG. 3. It will be understood that the arrangement of FIG. 3 is just an example and that other arrangements can be used.

FIG. 3 shows two successive time slots, indicated by the vertical solid lines, which can be called a sub-frame. The frequency range depicted in FIG. 3 includes about twenty-six subcarriers, only nine of which are explicitly indicated. RS transmitted by a first transmit (TX) antenna of a Node B are denoted R and by a possible second TX antenna in the node are denoted by S. In FIG. 3, RS are depicted as transmitted on every sixth subcarrier in OFDM symbol 0 and OFDM symbol 3 or 4 (depending on whether the symbols have long or short cyclic prefixes) in every slot. Also in FIG. 3, the RSs in symbols 3 or 4 are offset by 3 subcarriers relative to the RS in OFDM symbol 0, the first OFDM symbol in a slot.

The artisan will understand that it is desirable for a UE to base its RSRP measurements on RS transmitted from all TX antennas used by a node for a cell. Nevertheless, the number of TX antennas used by a cell detected in a cell search procedure but not currently connected to the UE (which can be called "a detected neighboring cell") is typically not known in advance by the UE. As a result, the UE needs to determine the number of TX antennas "blindly", i.e., without receiving a special message informing the UE of that number. When signals transmitted by a cell are received by a UE with low signal-to-interference ratios (SIRs), the risk of blindly detecting an erroneous number of TX antennas is significant. Low SIR is a common situation for a detected neighboring cell because such a cell's signal power level at the UE is usually lower than the received power level of the serving cell. Due to the increased probability of a blind detection error, RSRP measurements based on an assumed second TX antenna in low SIR conditions are unreliable with a potentially large bias.

One solution to this problem would be to have the UE execute a more computationally intensive blind detection algorithm in an effort to reduce the probability of its determining the wrong number of Node B TX antennas. Such an algorithm would typically require fast Fourier transform (FFT) processing of neighboring cell data. FFT processing consumes time, power, and/or hardware resources that are limited in many UEs and increases the complexity of the signal-power-estimate processing in a UE, both of which render this solution undesirable.

Furthermore, a UE typically assumes that the characteristics of the DL channel are constant over a number of subcarriers (i.e., the channel is constant with frequency) and over a number of OFDM symbols (i.e., the channel is constant in time). Based on that assumption, the UE estimates the RSRP by coherently averaging received symbols over such a "constant" group to get a channel estimate $H_i$ for a subcarrier i, computes the square of the absolute value of the channel estimate $|H_i|^2$ to obtain a received signal power estimate over the "constant" group of symbols, and then computes a non-coherent average of such signal power estimates over several groups, e.g., an entire channel bandwidth, to determine an RSRP measurement (estimate). Two such assumed "constant" groups are indicated in FIG. 3 by the dashed lines.

In the arrangement depicted in FIG. 3, such coherent averaging to estimate the RSRP can proceed as follows. The UE's baseband signal $Y_i$ corresponding to RS from TX antenna 1 can be written as follows:

$$Y_i = H_i^1 R_i + E_i \qquad \text{Eq. 1}$$

and the UE's baseband signal corresponding to RS from a possible TX antenna 2 can be written similarly as follows:

$$Y_i = H_i^2 S_i + E_i \qquad \text{Eq. 2}$$

Coherent averaging of a number M of received reference symbols followed by non-coherent averaging of N coherent averages can be written as follows:

$$S^{est} = \frac{1}{N} \sum_{n=1}^{N} \left| \frac{1}{M} \sum_{m=1}^{M} RS_m^{est} \right|_n^2 \qquad \text{Eq. 3}$$

in which $S^{est}$ is the RSRP measurement (estimate) and $RS^{est}$ are the estimated RS symbols.

The unreliability and potentially large bias of RSRP measurements based on an assumed second TX antenna in low SIR conditions can now be understood for the exemplary case of additive white Gaussian noise, i.e., a static channel impaired by only addition of wideband noise having a constant spectral density. The received signal power estimate $S^{est}$ described by Eq. 3 can approximated by:

$$S^{est} = S + 1/M \qquad \text{Eq. 4}$$

in which S is the received signal power. If S is large, then $S^{est}=S$ in Eq. 4, and if S is small, then $S^{est}=1/M$, which is to say $S^{est}$ has a bias. The number N affects only the variance, not the bias of the estimate, as explained in U.S. Patent Application Publication No. US 2008/0101488 A1 by L. Wilhelmsson et al. for "Robust and Low-Complexity Combined Signal Power Estimation", for example.

In addition, the DL channel commonly suffers from delay spread and Doppler shift, and so the channel is not constant as typically assumed, leading again to increased probability of biassed RSRP measurement values. A known solution to this problem of varying DL channels is to use more advanced methods of estimating the channel and signal power (e.g., methods based on Wiener filtering). Like the FFT processing mentioned above, such more advanced methods are computationally intensive and need to be done on each detected neighboring cell, rendering this solution undesirable.

Therefore, there is a need for improved methods and apparatus for measuring signal power of cells without significantly increasing the complexity of the measurements.

SUMMARY

In one aspect of this invention, there is provided, in a receiver, a method of estimating a received power of at least one signal having a pattern known to the receiver, the signal having been transmitted by at least one antenna. The method includes using a first method of measuring the received power based on the pattern, the first method generating a first sequence of first power estimates; determining whether a predetermined first event has occurred; and if the first event has occurred, changing to a second method of measuring the received power, the second method being different from the first method and generating a second sequence of second power estimates.

In another aspect of this invention, there is provided an apparatus in a receiver for measuring a received power of at least one signal having a pattern known to the receiver, the signal having been transmitted by at least one antenna. The apparatus includes a channel estimator configured to generate channel estimates based on the pattern in the at least one signal; a power estimator configured to generate received signal power estimates based on the channel estimates; and a controller configured to determine which of a first method and a second estimating method is used by at least one of the channel estimator and the power estimator. The first and second methods are different and generate respective sequences of first and second power estimates.

In another aspect of this invention, there is provided a computer-readable medium containing instructions that, when executed by the computer, cause the computer to carry out a method in a receiver of measuring a received power of at least one signal having a pattern known to the receiver, the signal having been transmitted by at least one antenna. The method includes using a first method of measuring the received power based on the pattern, the first method generating a first sequence of first power estimates; determining whether a predetermined first event has occurred; and if the first event has occurred, changing to a second method of measuring the received power, the second method being different from the first method and generating a second sequence of second power estimates.

BRIEF DESCRIPTION OF THE DRAWINGS

The several features, objects, and advantages of this invention will be understood by reading this description in conjunction with the drawings, in which.

DETAILED DESCRIPTION

As described in more detail below, the methods and apparatus for measuring received signal power for handover measurements (e.g., RSRP and similar measurements) in 3G LTE and similar communication systems are adapted based on the estimated (measured) signal power level such that computationally intensive channel and signal-power estimation methods are used only when necessary. Thus, a good trade-off between signal power measurement complexity and signal power measurement performance can be achieved.

For instance, measurements (e.g., RSRP measurements and channel estimation) are based on reference (pilot) symbols transmitted from only one TX antenna of a Node B when the received signal power (or SIR) is low. When the received signal power (or SIR) is high, the measurements are based on an average (or sum) of reference symbols transmitted from at least two Node B TX antennas.

Figure 3:
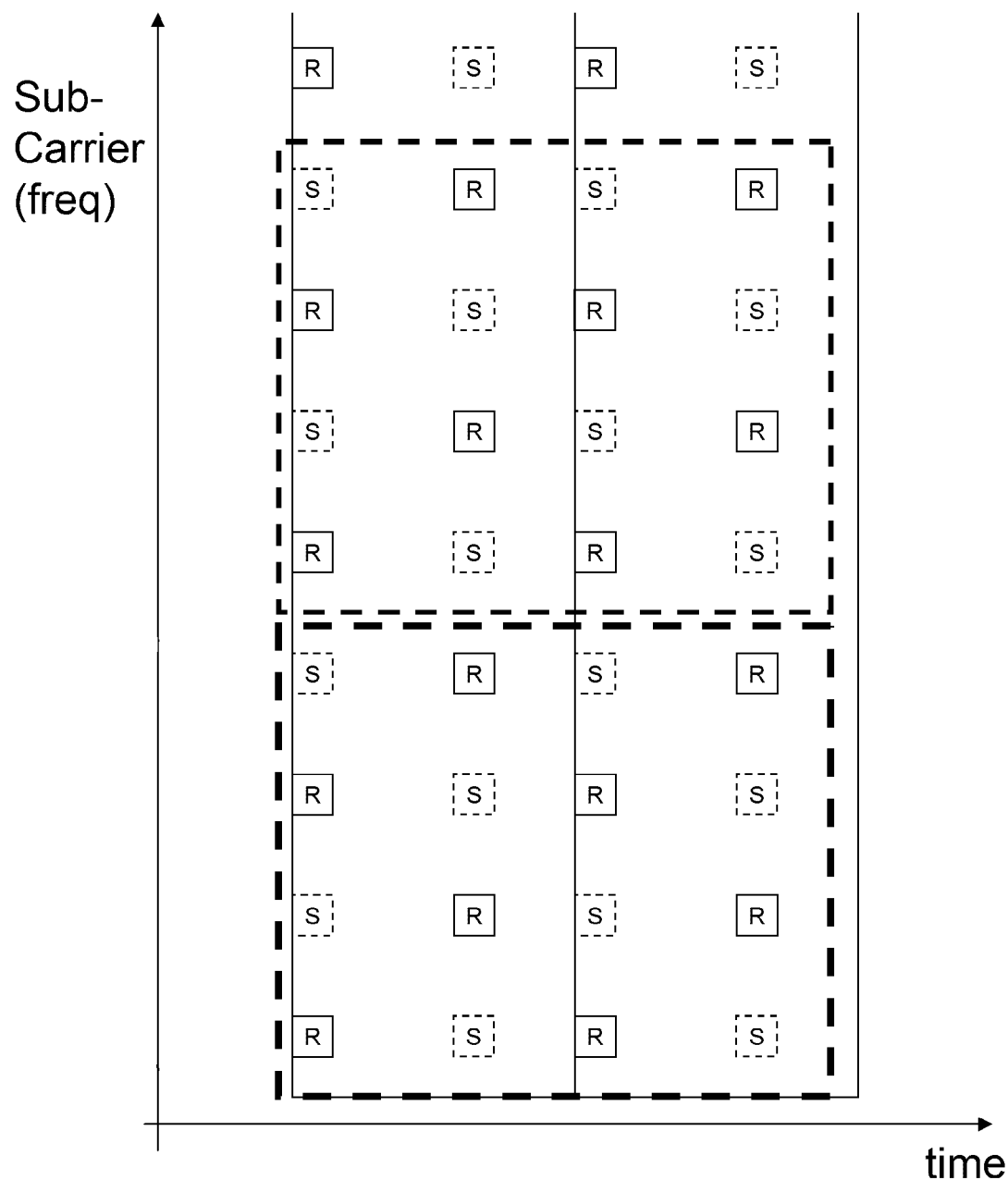
FIG. 3 depicts reference signals in a communication system that uses orthogonal frequency division multiple access.

As an alternative, the measurement method can be changed according to the measured (estimated) signal power (or SIR) level. When the estimated power level is low, a simple measurement method is used, e.g., a method of channel estimation based on simple averaging according to Eq. 3 above. When the estimated power level is high, a more complicated measurement method is used. Such a more complicated measurement method can include channel estimation based on one or more estimated channel characteristics, such as Doppler shift and delay spread, that can be expressed as follows:

$$S^{est} = \frac{1}{NM}\sum_{n,m} S^{est}_{n,m} = \frac{1}{NM}\sum_{n,m}\left|\sum_{k,l} a_{l-m,k-n} RS^{est}_{k-m,l-n}\right|^2 \qquad \text{Eq. 5}$$

in which the $a_{m,\,n}$ are suitable coefficients that depend on Doppler shift, delay spread, or other subcarrier channel characteristic; l and k are time and frequency indices, respectively; and m and n are indices of time and frequency positions of received reference symbols RS at totals of M and N time and frequency positions as depicted in FIG. 3.

According to Eq. 5, a received signal estimate $S_{n,m}^{est}$ is generated for each received reference symbol $RS_{n,m}$, and each such received signal estimate is generated by linear filtering of the neighboring RSs with filter coefficients $a_{l-m,k-n}$ that are a function of Doppler shift, delay spread, etc. As an example, the greater the Doppler shift, the faster $|a|$ decays as $|l-m|$ increases, and the greater the delay spread, the faster $|a|$ decays as $|k-n|$ increases.

The change to a more advanced measurement method can be based on an absolute signal level/threshold or alternatively on a relative signal level/threshold, where the relation for triggering a particular measurement method for a particular neighboring cell is based on the relative difference between the power (or SIR) of a neighboring cell and the power (or SIR) of the serving cell. In another alternative, the change is triggered only if the received power (or SIR) of less than a particular number of cells is measured using a more advanced method, in which case, the decision can be based on measurements using the second method.

Figure 1:
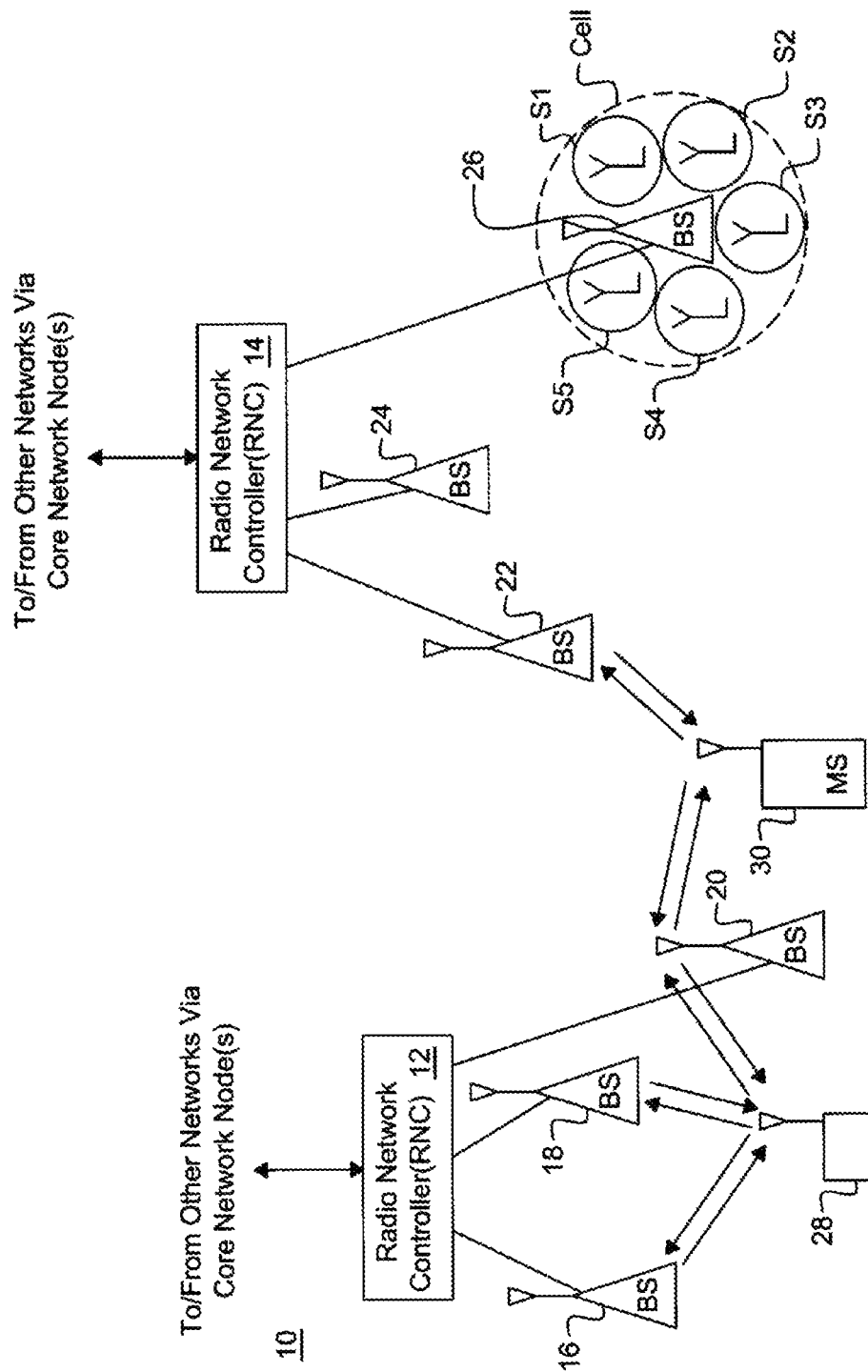
FIG. 1 depicts a cellular communication system.
Figure 2:
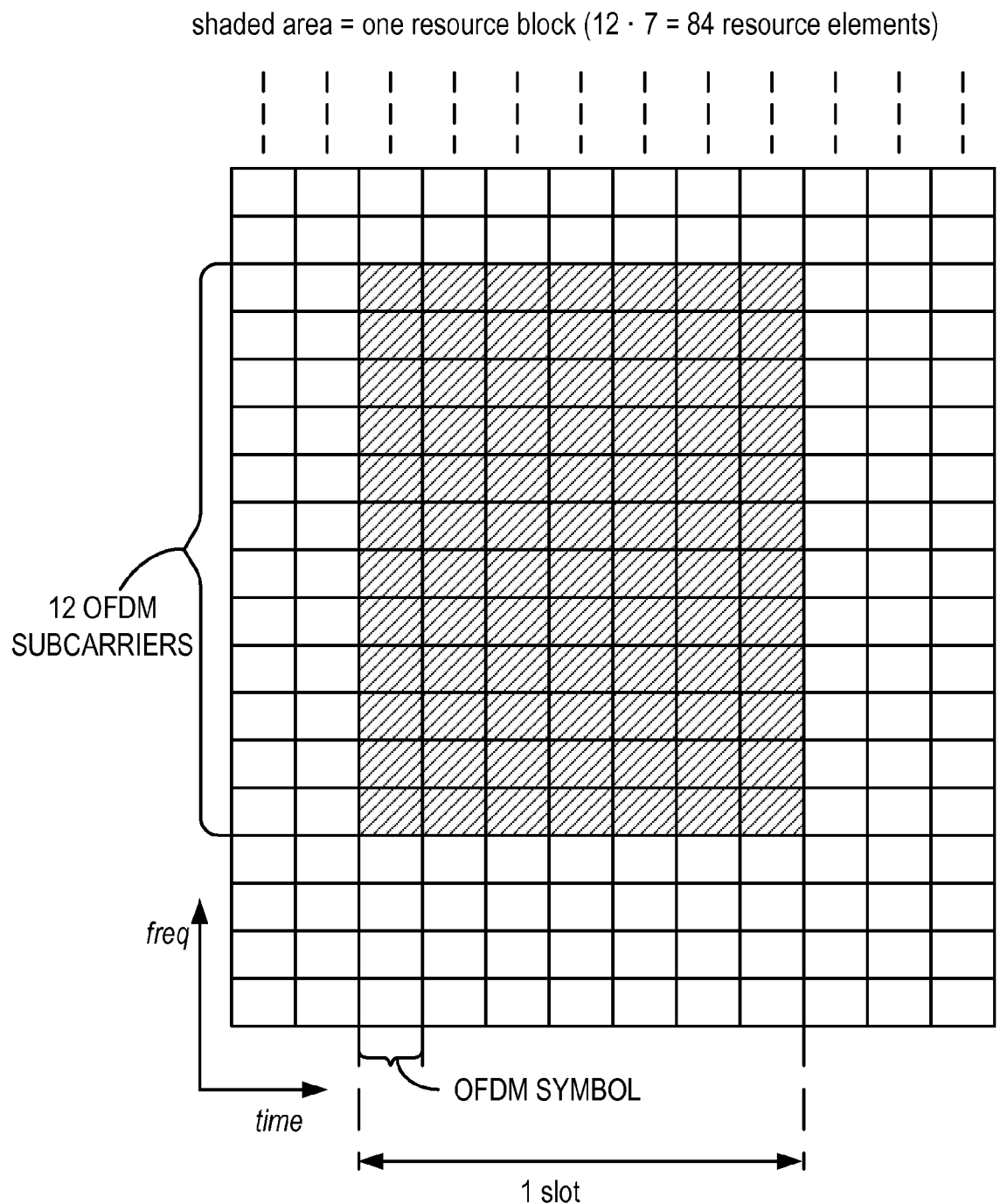
FIG. 2 depicts subcarriers and time intervals in a communication system that uses orthogonal frequency division multiple access.
Figure 4:
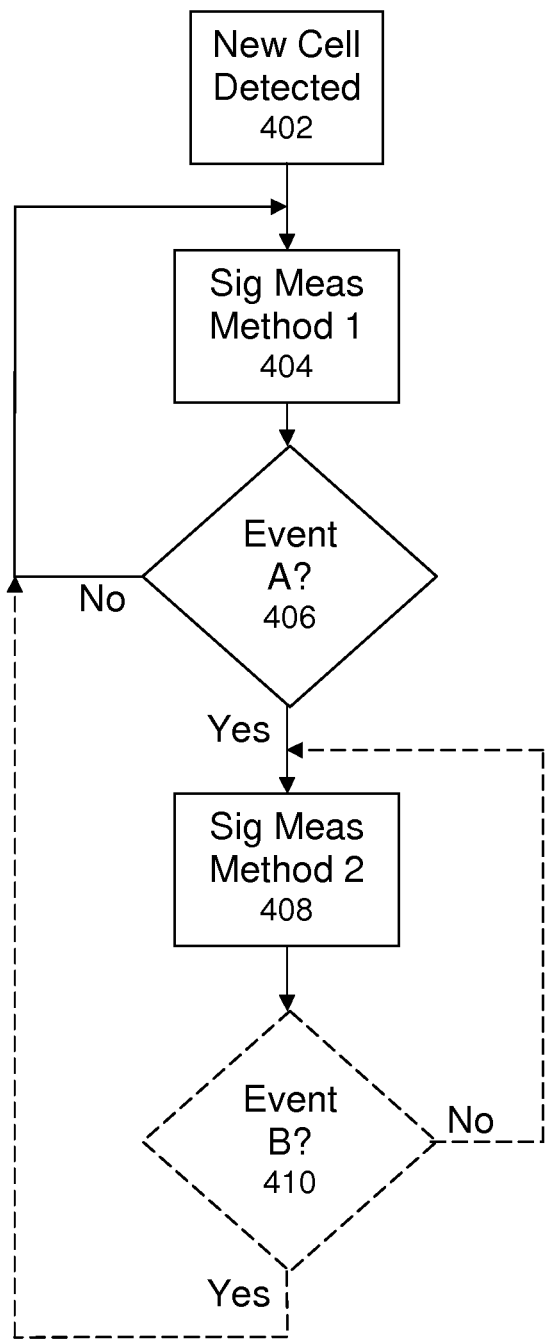
FIG. 4 is a flow chart of an improved measurement method.

FIG. 4 is a flow chart of an improved measurement method in accordance with this invention. For FIG. 4, a UE is assumed to be connected to a serving cell (or equivalently to be camped on a cell in idle mode) in a 3G LTE communication system such as that depicted in FIG. 1, but it will be appreciated, however, that this invention can be implemented in other communication systems. From time to time, the UE carries out a specified cell search procedure, e.g., for determining neighboring cells to be used as potential handover candidates and for other purposes. When such a new cell has been detected (step 402), the UE performs a received signal power (e.g., an RSRP) measurement using a first measurement method (step 404).

If the measured signal power does not meet one or more particular conditions that in FIG. 4 are called Event A (No in step 406), the process flow returns and power measurement on the detected cell continues using the first measurement method. It will be understood that step 404 can be carried out repeatedly according to the specifications of the communication system. If the UE determines that Event A has occurred (Yes in step 406), the UE starts to do signal power measurements on the detected neighboring cell according to a second measurement method (step 408).

As an option depicted by the dashed lines in FIG. 4, if the measurements according to the second method meet one or more further conditions that in FIG. 4 are called Event B (Yes in step 410), the UE performs measurements according to the first measurement method again. Otherwise (No in step 410), the UE continues to use the second signal measurement method.

The artisan will understand that the flow chart in FIG. 4 assumes only one detected new cell, but in general a UE can have a number of simultaneous detected neighboring cells for which RSRP measurements are made simultaneously or sequentially. Use of the first or second measurement methods can be chosen independently for each such cell, or use of the first or second measurement methods can be chosen based on whether the first or second methods has already been chosen for a selectable number of other detected neighboring cells. The selectable number can correspond to the processing load borne by the UE. Furthermore, the method depicted in FIG. 4 can be applied to measurements on the serving cell.

Figure 5:
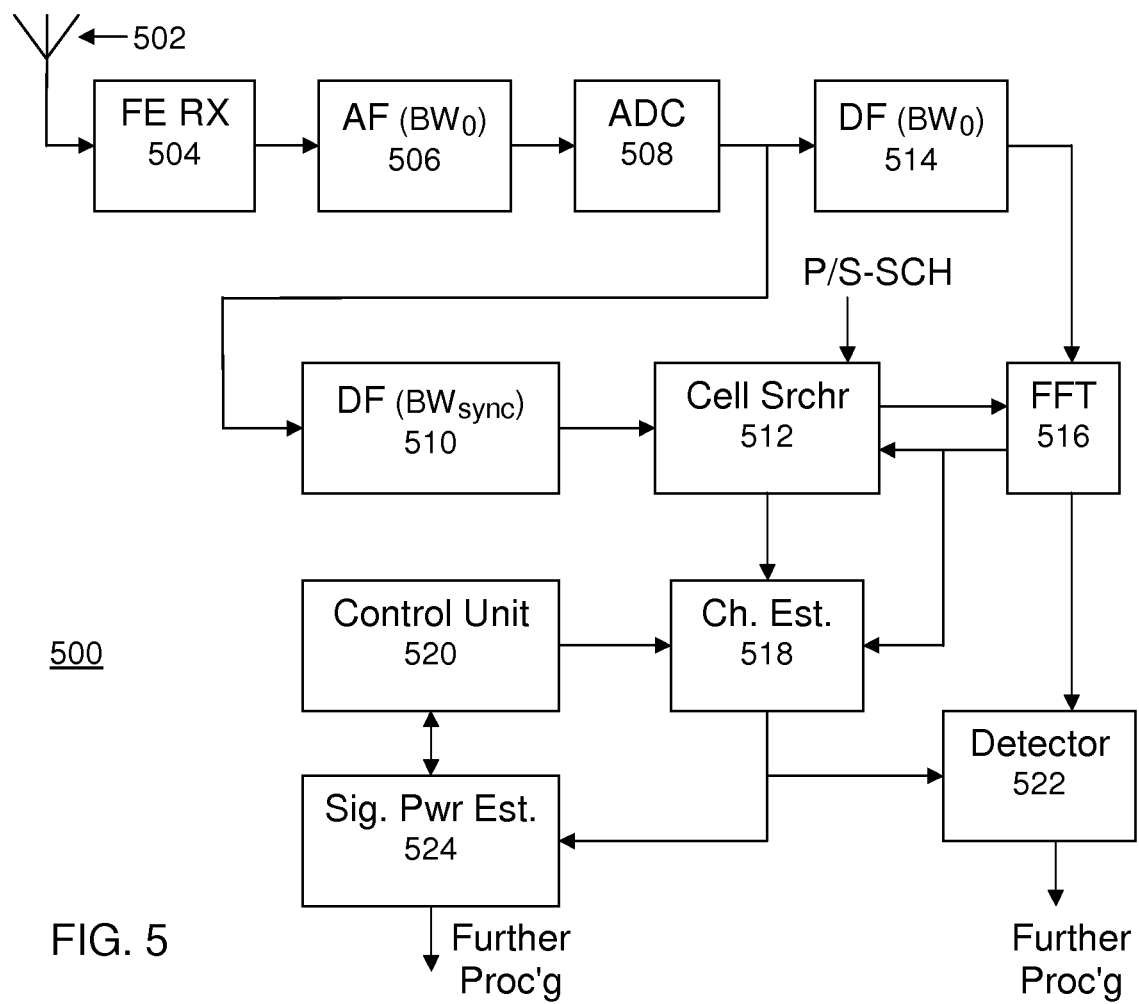
FIG. 5 is a block diagram of a portion of a received.

FIG. 5 is a block diagram of a portion 500 of a UE that can implement the methods described above. It will be appreciated that the functional blocks depicted in FIG. 5 can be combined and re-arranged in a variety of equivalent ways, and that many of the functions can be performed by one or more suitably programmed digital signal processors.

As depicted in FIG. 5, a UE receives a DL radio signal through an antenna 502 and typically down-converts the received radio signal to an analog baseband signal in a front end receiver (Fe RX) 504. The baseband signal is spectrally shaped by an analog filter 506 that has a bandwidth $BW_0$, and the shaped baseband signal generated by the filter 506 is converted from analog to digital form by an analog-to-digital converter (ADC) 508.

The digitized baseband signal is further spectrally shaped by a digital filter 510 that has a bandwidth $BW_{sync}$, which corresponds to the bandwidth of synchronization signals or symbols included in the DL signal. The shaped signal generated by the filter 510 is provided to a cell search unit 512 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided by the ADC 508 to a digital filter 514 that has the bandwidth $BW_0$, and the filtered digital baseband signal is provided to a processor 516 that implements an FFT or other suitable algorithm that generates a frequency-domain (spectral) representation of the baseband signal. The cell search unit 512 exchanges suitable timing signals with the processor 516 for each candidate cell, i.e., each cell whose signal power (e.g., RSRP) will be measured.

The cell search unit 512 also provides cell identifications and REs corresponding to RSs for each candidate cell to a channel estimation unit 518, which also receives timing signals from the processor 516 and generates a channel estimate $H_{i,j}$ for each of several subcarriers i and cells j. For example, the unit 518 can generate the channel estimates according to either the first or the second estimation method as described above based on control signals provided by a control unit 520.

The estimator 518 provides the channel estimates $H_i$ to a symbol detector 522 and further processing in the UE (not shown), and also to a signal power estimation unit 524 that generates received signal power measurements (e.g., estimates of RSRP, received subcarrier power $S_i$, SIR, etc.). The estimator 524 can generate such estimates in various ways, for example, based on Eq. 3 or on Eq. 5 above.

Based on the received signal power measurements by the estimator 524, the control unit 520 determines which estimation method is used by the estimator 518 and/or by the estimator 524 for measurements on the detected cell(s). The determinations by the control unit 520 can, as described above, be based on absolute signal power values, as well as on relative signal power values (relative to other detected/serving cells). The power estimates generated by the estimator 524 are typically also used in further signal processing in the UE.

Further examples of first and second signal power measurement methods are described below.

RSRP Measurements Based on One or Two (or More) TX Antennas

In a 3G LTE communication system, the RS from a first TX antenna is always transmitted (see FIG. 3), and so after a UE has detected a cell, RSRP measurements based on that one TX antenna can be done. Measuring RSRP based on one TX antenna can be considered as the first measurement method in the flowchart of FIG. 4.

As noted above, the number of TX antennas in a cell is unknown to the UE and needs to be blindly detected. When the received signal power of the cell is low relative to the sum of the received signal powers of other cells and noise (e.g., RSRP values that are −3 dB relative to the RSRP values for the strongest detected cell, which may be the serving cell), the accuracy of the blind detection method is poor. For RSRP values greater than −3 dB relative to the strongest detected cell, the TX antenna detection accuracy is good. Poor accuracy generally means that the probability of correct detection, i.e., that two TX antennas are detected when two antennas are used and one TX antenna is detected when one antenna is used, is below 0.8 or so, and good accuracy means that the probability of correct detection is at least about 0.9. Hence, after a UE has detected a second TX antenna (see Event A in FIG. 4), the UE starts to do RSRP measurements based on both TX antennas. Measuring RSRP based on two (or more) TX antennas can be considered as the second measurement method in FIG. 4.

It will be understood that Event A can be arranged such that it indicates the UE has detected at least one second TX antenna for a cell and has measured that cell's RSRP as greater than a particular amount, e.g., −3 dB, relative to the RSRP measured for the strongest detected cell. After the UE has detected and used RSs for RSRP estimation from more than one TX antenna, the UE can continue to use the RS from the second (or more) TX antenna even after the RSRP for the cell has fallen below a particular amount, e.g., −3 dB, relative to the RSRP measured for the strongest detected cell. In that case, the optional step 410 in FIG. 4 is omitted.

Adaptation of Channel (and/or Signal Power) Estimation Method

For detected neighboring cells having an RSRP value that is low relative to the RSRP value of the strongest detected cell, a good trade-off between performance (in terms of bias or variance) and measurement complexity is to use a channel estimation method like the one described above in relation to FIG. 3. This can be considered as a first signal measurement method.

For detected cells having RSRP values close to the RSRP value of the strongest detected cell, e.g., values that are no worse than −4 dB relative to the strongest cell's value (Event A in FIG. 4), more advanced RSRP measurement or channel estimation methods can be used. Any such more advanced method can be considered as a second measurement method.

For RSRP measurements, more advanced methods are those that take Doppler shift and/or delay spread into account, for example, to give better (e.g., lower bias/variance) RSRP measurement values. Another more advanced RSRP measurement method is described in the above-cited U.S. Patent Application Publication No. US 2008/0101488 A1, which is incorporated here by reference. For channel estimation, more advanced methods include estimators based on Wiener filtering.

When the RSRP measured for the cell then becomes low, e.g., −4 dB relative to the RSRP of the strongest cell (Event B in FIG. 4), the UE can change the measurement method back to the first method. In that case, the optional step 410 in FIG. 4 is performed.

The artisan will understand that in addition to or instead of changing power and/or channel estimation methods based on comparison of measurements of a cell to measurements of the strongest cell, the changes can be based on computed trends in the measurements. For example, if a UE has been using a simple measurement method on a detected neighboring cell, the UE can look at stored (past) measurement values in an effort to "predict" that the RSRP will increase (and trigger Event A). Such a UE can trigger Event A "early" based on its prediction, or just prepare to change methods, e.g., by initializing a relevant processor. This might be the situation when a UE is moving toward a detected neighboring cell. Similar computations can be performed to compute a trend in the opposite direction, e.g., when a UE is moving away from a detected neighboring cell.

In addition to using relative and absolute levels, it is possible to use the first signal measurement method level to estimate a possible bias for this signal measurement method and base the threshold for Event A on this possible bias. As described above, the possible bias can be estimated based on Eq. 4.

It will be appreciated that procedures described above are carried out repetitively as necessary, for example, to respond to the time-varying nature of communication channels between transmitters and receivers. In addition, in terms of the downlink and a UE, it will be understood that the methods and apparatus described here can be implemented in a BS or other uplink receiving node.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. In a receiver, a method of measuring a received power of at least one signal having a pattern known to the receiver, the signal having been transmitted by at least one antenna, the method comprising: using a first method of measuring the received power based on the pattern, the first method generating a first sequence of first power estimates; determining whether a predetermined first event has occurred based on the received signal power; and if the first event has occurred, changing to a second method of measuring the received power, the second method being different from the first method and generating a second sequence of second power estimates; wherein determining whether the predetermined first event has occurred includes detecting that the signal was transmitted by at least two antennas, and the second method of measuring the received power differs from the first method at least in that the second method generates the second sequence based on the patterns transmitted by the at least two antennas.

2. The method of claim 1, wherein whether the first event has occurred is determined based on the first sequence of first power estimates.

3. The method of claim 1, wherein the second method generates second power estimates that have a lower bias than the first power estimates.

4. The method of claim 3, wherein the second method includes channel estimation based on at least one channel characteristic expressed as follows:

$$S^{est} = \frac{1}{NM} \sum_{n,m} \left| \sum_{k,l} a_{l-m,k-n} RS^{est}_{k-m,l-n} \right|^2$$

in which $S^{est}$ represents a received signal power estimate, $RS^{est}$ represents an estimated reference symbol, a is a coefficient that depends on the at least one channel characteristic, l and k are time and frequency indices; and m and n are indices of time and frequency positions of received reference symbols RS at totals of M and N time and frequency positions.

5. The method of claim 1, wherein the first method includes coherent averaging of a number M of received reference symbols followed by non-coherent averaging of N coherent averages.

6. The method of claim 1, further comprising:
if a change to the second method has occurred, determining whether a predetermined second event has occurred based on the second sequence of second power estimates; and
if the second event has occurred, changing back to the first method of measuring the received power.

7. An apparatus in a receiver for measuring a received power of at least one signal having a pattern known to the receiver, the signal having been transmitted by at least one antenna, the apparatus comprising: a channel estimator configured to generate channel estimates based on the pattern in the at least one signal; a power estimator configured to generate received signal power estimates based on the channel estimates; and a controller configured to determine which of a first method and a second estimating method is used by at least one of the channel estimator and the power estimator based on the received signal power, wherein the first and second methods are different and generate respective sequences of first and second power estimates; wherein the controller determines which of the first and second methods is used based on whether the signal was transmitted by at least two antennas, and the second method differs from the first method at least in that the second method generates the second sequence based on the patterns transmitted by the at least two antennas.

8. The apparatus of claim 7, wherein the controller determines which of the first and second methods is used based on absolute signal power values or relative signal power values.

9. The apparatus of claim 7, wherein the second method generates second power estimates that have a lower bias than the first power estimates.

10. The apparatus of claim 9, wherein the second method includes channel estimation based on at least one channel characteristic expressed as follows:

$$S^{est} = \frac{1}{NM} \sum_{n,m} \left| \sum_{k,l} a_{l-m,k-n} RS^{est}_{k-m,l-n} \right|^2$$

in which $S^{est}$ represents a received signal power estimate, $RS^{est}$ represents an estimated reference symbol, a is a coefficient that depends on the at least one channel characteristic, l and k are time and frequency indices; and m and n are indices of time and frequency positions of received reference symbols RS at totals of M and N time and frequency positions.

11. The apparatus of claim 7, wherein the first method includes coherent averaging of a number M of received reference symbols followed by non-coherent averaging of N coherent averages.

12. The apparatus of claim 7, wherein the controller is further configured to cause the at least one of the channel estimator and the power estimator to use the first method based on whether the controller has determined that the second method is used and on the second sequence of second power estimates.

13. A non-transitory computer-readable medium containing instructions that, when executed by the computer, cause the computer to carry out a method in a receiver of measuring a received power of at least one signal having a pattern known to the receiver, the signal having been transmitted by at least one antenna, wherein the method comprises: using a first method of measuring the received power based on the pattern, the first method generating a first sequence of first power estimates; determining whether a predetermined first event has occurred based on the received signal power; and if the first event has occurred, changing to a second method of measuring the received power, the second method being different from the first method and generating a second sequence of second power estimates; wherein determining whether the predetermined first event has occurred includes detecting that the signal was transmitted by at least two antennas, and the second method of measuring the received power differs from the first method at least in that the second method generates the second sequence based on the patterns transmitted by the at least two antennas.

14. The non-transitory computer-readable medium of claim 13, wherein whether the first event has occurred is determined based on the first sequence of first power estimates.

15. The non-transitory computer-readable medium of claim 13, wherein the second method generates second power estimates that have a lower bias than the first power estimates.

16. The non-transitory computer-readable medium of claim 15, wherein the second method includes channel estimation based on at least one channel characteristic expressed as follows:

$$S^{est} = \frac{1}{NM} \sum_{n,m} \left| \sum_{k,l} a_{l-m,k-n} RS^{est}_{k-m,l-n} \right|^2$$

in which $S^{est}$ represents a received signal power estimate, $RS^{est}$ represents an estimated reference symbol, a is a coefficient that depends on the at least one channel characteristic, l and k are time and frequency indices; and m and n are indices of time and frequency positions of received reference symbols RS at totals of M and N time and frequency positions.

17. The non-transitory computer-readable medium of claim 13, wherein the first method includes coherent averaging of a number M of received reference symbols followed by non-coherent averaging of N coherent averages.

18. The non-transitory computer-readable medium of claim 13, wherein the method further comprises:
    if a change to the second method has occurred, determining whether a predetermined second event has occurred based on the second sequence of second power estimates; and
    if the second event has occurred, changing back to the first method of measuring the received power.

* * * * *